United States Patent
Li et al.

(10) Patent No.: US 11,487,491 B2
(45) Date of Patent: Nov. 1, 2022

(54) SCREEN PROJECTION METHOD AND APPARATUS, AND STORAGE MEDIUM

(71) Applicant: BEIJING BAIDU NETCOM SCIENCE AND TECHNOLOGY CO., LTD., Beijing (CN)

(72) Inventors: Zhilin Li, Beijing (CN); Xingbiao Li, Beijing (CN); Qiuyan Luo, Beijing (CN); Huimin Fan, Beijing (CN); Meiyuan Ding, Beijing (CN); Lina Hu, Beijing (CN); Huibin Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/394,740

(22) Filed: Aug. 5, 2021

(65) Prior Publication Data

US 2021/0365229 A1    Nov. 25, 2021

(30) Foreign Application Priority Data

Feb. 26, 2021    (CN) .......................... 202110220847.0

(51) Int. Cl.
*G06F 3/14* (2006.01)
*G09G 5/14* (2006.01)

(52) U.S. Cl.
CPC .......... *G06F 3/1423* (2013.01); *G06F 3/1454* (2013.01); *G09G 5/14* (2013.01); *G09G 2354/00* (2013.01)

(58) Field of Classification Search
CPC .... G06F 3/1423; G06F 3/1454; G06F 3/0484; G06F 16/3329; G06F 16/5846;

(Continued)

(56) References Cited

U.S. PATENT DOCUMENTS

2007/0112926 A1* 5/2007 Brett .................... G06Q 10/109
709/206
2007/0162315 A1   7/2007 Hodges
(Continued)

FOREIGN PATENT DOCUMENTS

CN    108736981 A    11/2018
CN    110515573 A    11/2019
(Continued)

OTHER PUBLICATIONS

Extended European Search Report issued in EP Application 21189830.9, dated Jan. 31, 2022, 10 pages.

(Continued)

*Primary Examiner* — Michael J Eurice
(74) *Attorney, Agent, or Firm* — Osha Bergman Watanabe & Burton LLP

(57) ABSTRACT

The disclosure provides a screen projection method, a screen projection apparatus and a storage medium. The method includes: determining, in response to a meeting screen projection request of a user, at least one candidate meeting reservation notification that meets a preset condition from current meeting reservation notifications of the user; obtaining and displaying meeting prompt information corresponding to each candidate meeting reservation notification; obtaining a first screen projection code corresponding to the meeting prompt information; and performing, in response to detecting a screen projection instruction of the user for a target meeting prompt information of the meeting prompt information, a screen projection connection with a screen projection device based on the first screen projection code and the target meeting prompt information.

13 Claims, 6 Drawing Sheets

(58) Field of Classification Search
CPC .. G06Q 10/10; G06Q 10/109; G06Q 10/1095; G06Q 10/02; G06Q 10/06; G06Q 10/0631; G09G 5/14; G09G 2354/00; H04L 12/1818; H04M 3/567; H04N 7/15; H04N 7/155; H04N 21/4122; H04N 21/43076; H04N 21/43615; H04N 21/4363; H04N 21/47214
See application file for complete search history.

(56) References Cited

U.S. PATENT DOCUMENTS

| | | | | |
|---|---|---|---|---|
| 2013/0127979 | A1* | 5/2013 | Koh | H04M 3/567 |
| | | | | 348/E7.083 |
| 2014/0313282 | A1* | 10/2014 | Ma | H04N 7/141 |
| | | | | 348/14.09 |
| 2015/0121466 | A1* | 4/2015 | Brands | H04L 12/1818 |
| | | | | 726/4 |
| 2016/0321567 | A1 | 11/2016 | Sandholm et al. | |
| 2017/0147950 | A1 | 5/2017 | Carbonell et al. | |
| 2017/0357915 | A1 | 12/2017 | Holmes et al. | |
| 2019/0166330 | A1* | 5/2019 | Ma | H04L 65/403 |

FOREIGN PATENT DOCUMENTS

| | | |
|---|---|---|
| CN | 111221484 A | 6/2020 |
| JP | 2006309297 A | 11/2006 |

OTHER PUBLICATIONS

Office Action issued in corresponding CN Application No. 202110220847.0 with English translation dated May 7, 2022 (22 pages).

* cited by examiner

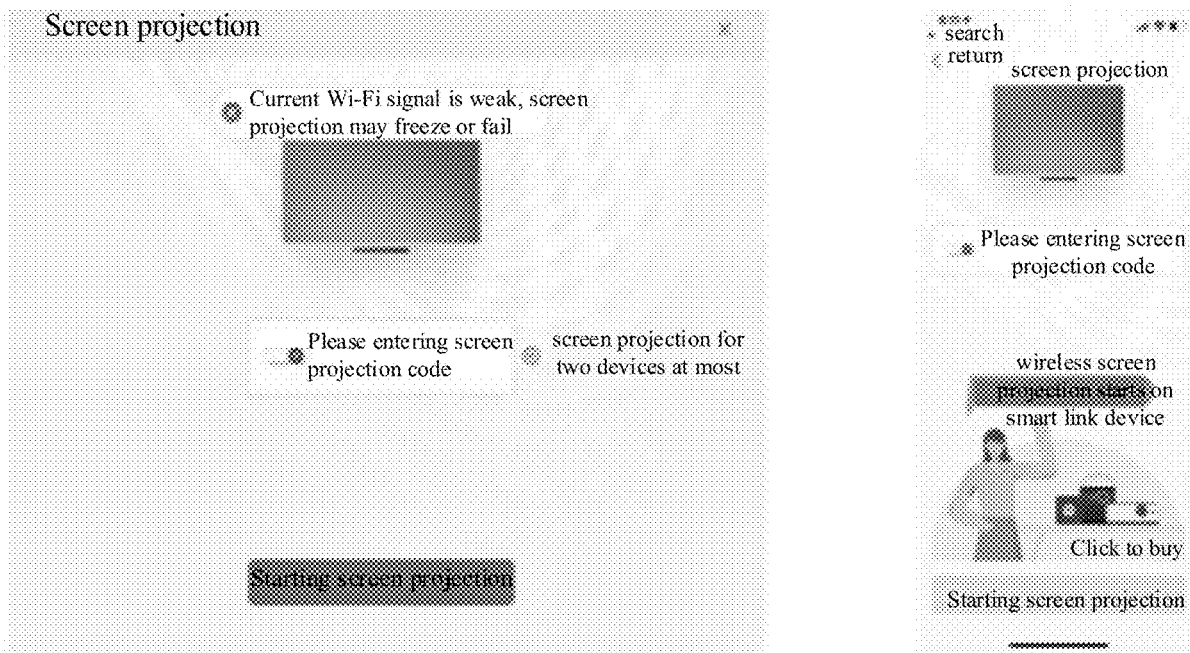

FIG. 1

```
determining, in response to a meeting screen projection request of a user, at    201
least one candidate meeting reservation notification that meets a preset
condition from current meeting reservation notifications of the user obtaining and displaying meeting prompt information corresponding to each       202
candidate meeting reservation notification obtaining a first screen projection code corresponding to the meeting prompt    203
information performing, in response to detecting a screen projection instruction of the
user for a target meeting prompt information of the meeting prompt              204
information, a screen projection connection with a screen projection device
based on the first screen projection code and the target meeting prompt
information
```

FIG. 2

SCREEN PROJECTION METHOD AND APPARATUS, AND STORAGE MEDIUM

CROSS-REFERENCE TO RELATED APPLICATION

The present application is based upon and claims priority to Chinese Patent Application No. 202110220847.0, filed on Feb. 26, 2021, the entirety contents of which are incorporated herein by reference.

TECHNICAL FIELD

The disclosure relates to the field of artificial intelligence technologies such as Natural Language Processing (NLP), and in particular to a screen projection method, a screen projection apparatus, and a storage medium.

BACKGROUND

In an office scenario, in order to organize a meeting to present prepared documents for easy understanding and discussion of meeting content by participants, generally, computer/mobile screen is projected onto a projector or TV in a meeting room.

In the related art, relevant software is used for screen projection. Regardless of whether the terminal device is a desktop or a mobile terminal, the user needs to see and remember a projection code provided by the projector in the meeting room before screen projection. Then, the corresponding projection code is input on the computer or mobile phone for screen projection.

SUMMARY

The embodiments of the disclosure provide a screen projection method, a screen projection apparatus, and a storage medium.

Embodiments of the disclosure provide a screen projection method. The method includes: determining, in response to a meeting screen projection request of a user, at least one candidate meeting reservation notification that meets a preset condition from current meeting reservation notifications of the user; obtaining and displaying meeting prompt information corresponding to each candidate meeting reservation notification; obtaining a first screen projection code corresponding to the meeting prompt information; and performing, in response to detecting a screen projection instruction of the user for a target meeting prompt information of the meeting prompt information, a screen projection connection with a screen projection device based on the first screen projection code and the target meeting prompt information.

Embodiments of the disclosure provide a screen projection apparatus. The apparatus includes: one or more processors; a memory storing instructions executable by the one or more processors; in which the one or more processors are configured to: determine, in response to a meeting screen projection request of a user, at least one candidate meeting reservation notification that meets a preset condition from current meeting reservation notifications of the user; obtain and display meeting prompt information corresponding to each candidate meeting reservation notification; obtain a first screen projection code corresponding to the meeting prompt information; perform, in response to detecting a screen projection instruction of the user for a target meeting prompt information of the meeting prompt information, a screen projection connection with a screen projection device based on the first screen projection code and the target meeting prompt information.

Embodiments of the disclosure in a fourth aspect provide a non-transitory computer-readable storage medium storing computer instructions. The computer instructions are used to make the computer implement a screen projection method according to embodiments of the disclosure. The method includes: determining, in response to a meeting screen projection request of a user, at least one candidate meeting reservation notification that meets a preset condition from current meeting reservation notifications of the user; obtaining and displaying meeting prompt information corresponding to each candidate meeting reservation notification; obtaining a first screen projection code corresponding to the meeting prompt information; and performing, in response to detecting a screen projection instruction of the user for a target meeting prompt information of the meeting prompt information, a screen projection connection with a screen projection device based on the first screen projection code and the target meeting prompt information.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which:

FIG. 1 is a schematic diagram of a screen projection scene in the related art.

FIG. 2 is a flowchart of a screen projection method according to the first embodiment of the disclosure.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

As mentioned in the background art, in the related art, the screen projection process requires the user to input the projection code on a projection device. For example, as illustrated in FIG. 1, regardless of whether the terminal device is a computer or a mobile phone, users need to see the projection code on the side of the projection device and a projection interface in the meeting room on a desktop side, which prolongs the projection process. Even when the users input the correct corresponding projection code, problems such as inputting wrong code or misremembering the projection code may be caused, which causes the user to enter the code multiple times and cause repeated checking and confirming, and increases the probability of occupying the meeting time.

In order to solve the above technical problems, in the screen projection method in the disclosure, the users' current meeting room information and the projection code are identified and matched, and rapid projection is realized through software technologies without manually inputting the projection code by the user, thereby achieving the effect of one-click projection.

In detail, FIG. 2 is a flowchart of a screen projection method according to the first embodiment of the disclosure. As illustrated in FIG. 2, the method further includes the following steps.

In step 201, in response to a meeting screen projection request of a user, at least one candidate meeting reservation notification that meets a preset condition is determined from current meeting reservation notifications of the user.

In an embodiment, the user's meeting screen projection request may be obtained in different ways, examples are provided as follows.

Example 1

Figure 3:
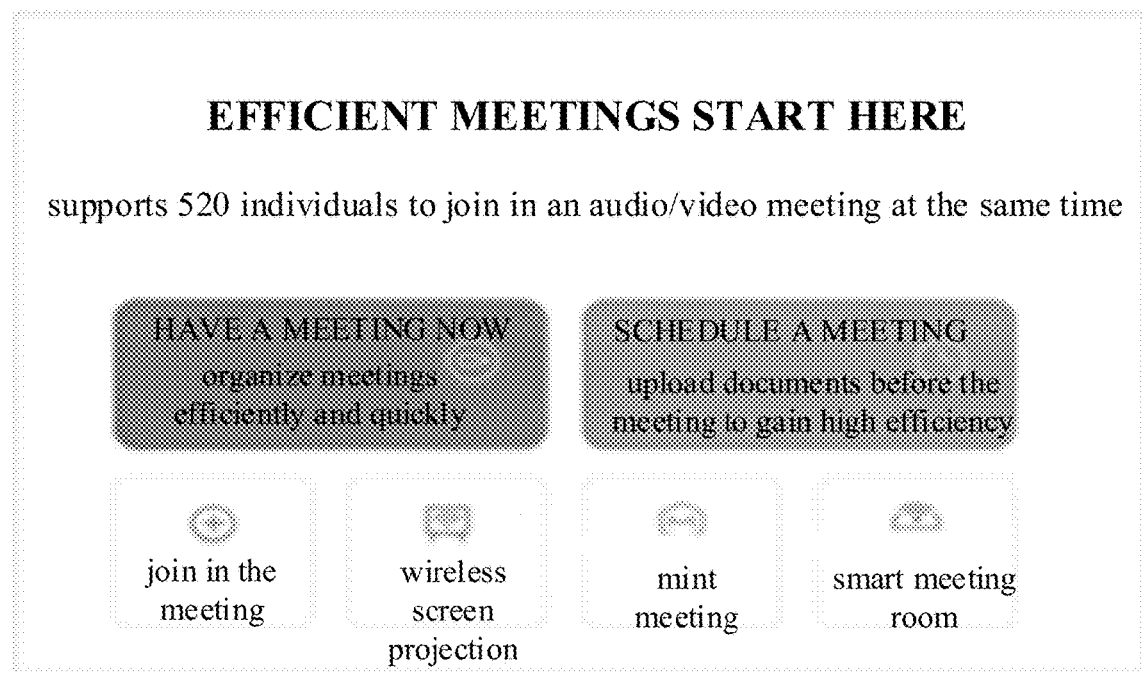
FIG. 3 is a schematic diagram of a screen projection scene according to a third embodiment of the disclosure.

In the example, a meeting screen projection software is provided, which includes a screen projection control, such as the "wireless screen projection" control shown in FIG. 3. If the user clicks on the control, the meeting screen projection request is obtained.

Example 2

In the example, the user's voice information is monitored, and if it is detected that the user's voice information contains a keyword "meeting screen projection", the meeting screen projection request is obtained.

Further, it should be understood that the user may have multiple scheduled meeting notifications, but not all scheduled meeting notifications are the meetings that the user may currently want to cast on the screen. Therefore, the user's current meeting reservation notifications are filtered to select the at least one candidate meeting reservation notification that meets the preset condition of the current meeting reservation notification of the user. The above preset conditions are understood as the conditions for filtering out meeting notifications that the user may currently want to project. In different application scenarios, different content may be included, examples are provided as follows.

Example 1

Figure 4:
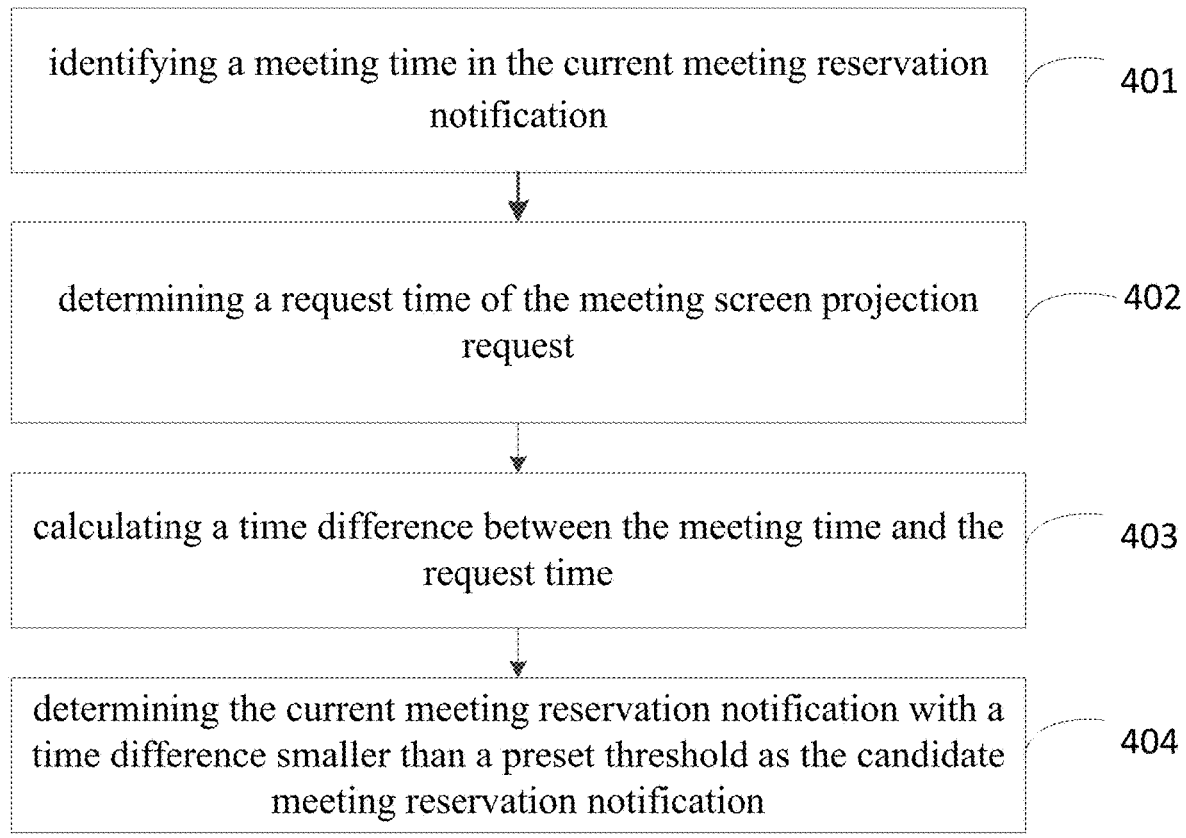
FIG. 4 is a flowchart of a screen projection method according to a fourth embodiment of the disclosure.

In the example, as illustrated in FIG. 4, determining the at least one candidate meeting reservation notification that meets the preset condition of the current meeting reservation notification of the user includes the following steps.

In step 401, a meeting time in the current meeting reservation notification is identified. It is understandable that the current meeting reservation notification generally includes the meeting time. For example, the current meeting reservation notification is "Test ROOM5 Test Building F1-C area, Dec. 25, 2020, 8:00 pm to 8:30 pm". Therefore, the meeting time is identified according to word recognition and NLP technologies.

In step 402, a request time of the meeting screen projection request is determined.

In an embodiment, the request time is determined according to a system time when the meeting screen projection request is received.

In step 403, a time difference between the meeting time and the request time is calculated.

In step 404, the current meeting reservation notification with a time difference smaller than a preset threshold is determined as the candidate meeting reservation notification.

The preset threshold may be calibrated according to experimental data.

In an embodiment, the time difference between the meeting time and the request time is calculated, and the current meeting reservation notification with the time difference smaller than the preset threshold is determined to be at least one candidate meeting reservation notification, that is, the candidate meeting reservation notifications closer to the request time are filtered out.

Example 2

It is easy to understand that when a user initiates the meeting screen projection request, the user is close to the projection screen. Therefore, a location of the user is obtained, and further, each current meeting reservation notification is identified according to the NLP technology. The corresponding meeting location in each current meeting reservation notification is identified according to the NLP technology, a distance range between the meeting location and the user location is calculated, and current meeting reservation notification whose distance range is within a preset range is determined as the candidate meeting reservation notification.

In step 202, meeting prompt information corresponding to each candidate meeting reservation notification is obtained and displayed.

In the example, in order to display the candidate meeting reservation notification message intuitively, the meeting prompt information corresponding to each candidate meeting reservation notification is obtained, and the meeting prompt information is displayed on the interface of the software.

The meeting prompt information is understood as a prompt message determined by any user as a corresponding meeting reservation notification. In different application scenarios, the meeting prompt information includes different content, examples are as follows.

Example 1

In the example, keywords of a meeting address in the candidate meeting reservation notification are obtained, and the meeting address information is obtained and displayed based on a preset database matching the keywords of the meeting address.

Figure 5:
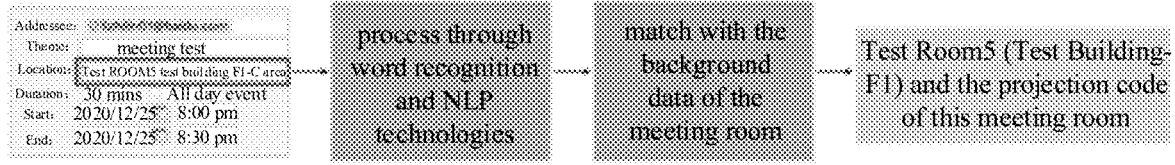
FIG. 5 is a schematic diagram of a screen projection scene according to a fifth embodiment of the disclosure.

As illustrated in FIG. 5, keywords of a meeting address in the candidate meeting reservation notification "Test ROOM5 Test Building F1-C area" are obtained according to word recognition and NLP technologies, and according to the keywords matching the preset database, namely the meeting room database, the corresponding meeting prompt information is determined as "Test ROOM5 Test Building F1-C area", the user intuitively knows which meeting the corresponding meeting is based on the meeting prompt information.

Example 2

In the example, the meeting time information in each candidate meeting reservation notification is identified, and the meeting time information is displayed, so that the user intuitively knows the time in each candidate meeting reservation notification.

Example 3

In the example, the meeting subject information in each candidate meeting reservation notification is obtained and displayed. The meeting subject information may be a main content of the meeting, so that the user intuitively knows the meeting corresponding to each candidate meeting reservation notification.

In step 203, a first screen projection code corresponding to the meeting prompt information is obtained.

In the example, the user of the first screen projection code connects the terminal device and the projection device where the meeting software is located. In an embodiment, the user does not need to manually input the first screen projection code, and the corresponding first screen projection code is directly obtained according to the meeting prompt information.

In step 204, in response to detecting a screen projection instruction of the user for a target meeting prompt information of the meeting prompt information, a screen projection connection with a screen projection device is performed based on the first screen projection code and the target meeting prompt information.

In an embodiment, if the user's screen projection instruction for the target meeting prompt information in at least one meeting prompt message is detected, for example, if the user's triggering operation on the target meeting prompt information is detected, it is considered that the corresponding screen projection instruction is obtained, and the screen projection connection with a screen projection device is performed based on the first screen projection code and the target meeting prompt information.

That is, the first screen projection code is sent to the server, and the server compares the first screen projection code with a screen projection code ratio of the screen projection code of the projection device to the screen projection code of the corresponding meeting, and if the above codes are consistent, the screen projection connection between the terminal device and the screen projection device is established.

Certainly, in the embodiments of the disclosure, not only the screen projection of a single meeting room could be met, in an embodiment of the disclosure, the user also selects multiple target meeting prompt messages to realize simultaneous screen projection of multiple projection devices.

Figure 6:
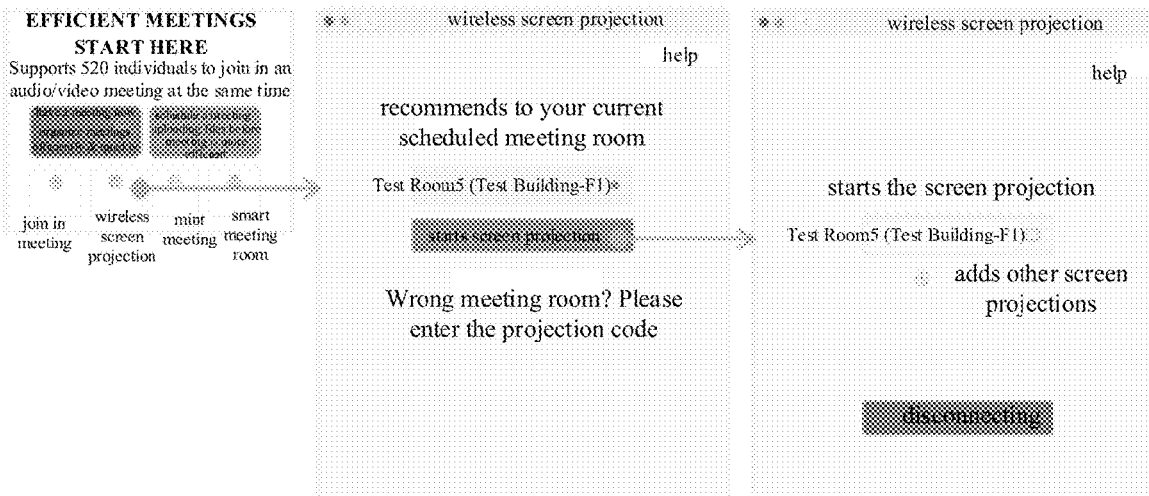
FIG. 6 is a schematic diagram of a screen projection scene according to a sixth embodiment of the disclosure.

For example, as illustrated in FIG. 6, when there is one piece of candidate meeting reservation notification, the meeting prompt message "Test ROOM5 Test Building F1" of the candidate meeting reservation notification is displayed. If the user selects the corresponding screen projection selection control and triggers "performing screen projection immediately", the screen projection connection with the screen projection device is performed based on the first screen projection code and the target meeting prompt information.

Figure 7:
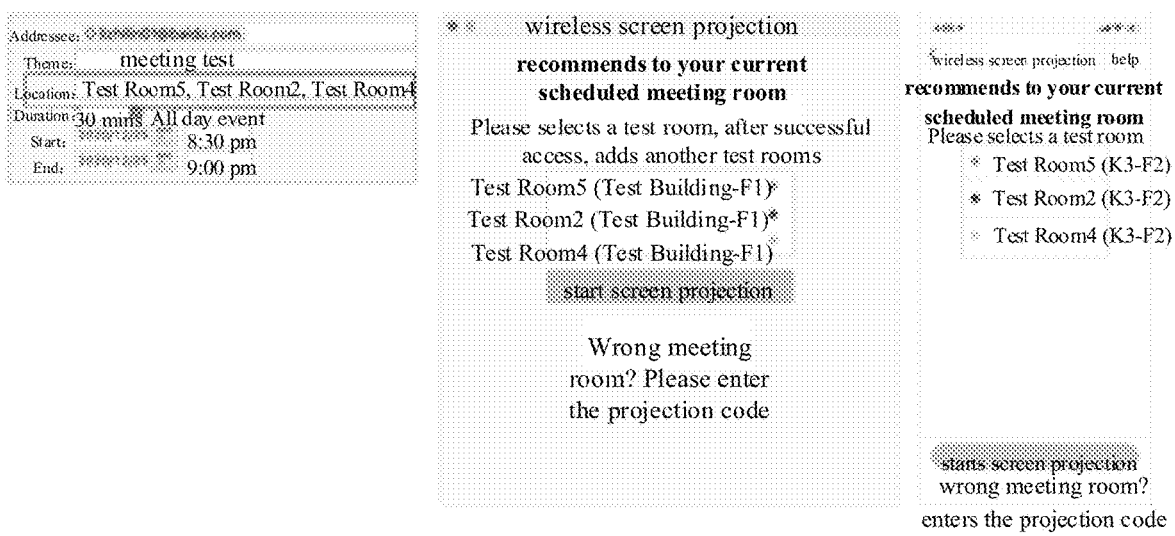
FIG. 7 is a schematic diagram of a screen projection scene according to a seventh embodiment of the disclosure.

For example, as illustrated in FIG. 7, when there are multiple candidate meeting reservation notifications, the meeting prompt information "Test ROOM5 Test Building F1", "Test ROOM2 Test Building F2" and "Test ROOM4 Test Building F3" of the multiple candidate meeting reservation notifications and a corresponding screen projection selection control (the origin in the figure) and a corresponding screen projection control are displayed. If the user selects the corresponding screen projection selection control and triggers "performing screen projection immediately", the screen projection connection with the screen projection device is performed based on the first screen projection code corresponding to the candidate meeting reservation notification.

In order to ensure a success rate of screen projection, after obtaining the first screen projection code, the corresponding meeting room may be automatically locked and whether the projector is normally turned on is displayed automatically. That is, the server learns the meeting room corresponding to the first screen projection code, and sends an inquiry message to the corresponding meeting room and the projector. According to the status information fed back by the meeting room and the projector, after determining that the meeting room and the projector are turned on, the screen projection connection processing is performed, otherwise, the user is notified that the projection device is not turned on.

Therefore, the screen projection method of the embodiments of the disclosure uses Baidu AI word recognition and NLP technologies to identify and match the user's current meeting room information and the projection code, and realizes rapid projection through software technology, the cost of the process is lower than hardware cost. The user only needs one step to complete the screen projection process in the meeting room: performing screen projection immediately when clicking in the meeting room is detected, which reduces the process of connecting to the screen in the meeting room and reduces the cost of user understanding and trial and error by replacing inputting with the selection, thereby eliminating the need for repeated confirmation on whether the time is correct, and improving the efficiency of connecting to the screen in the meeting room.

In conclusion, the screen projecting method of the embodiments of the disclosure, in response to the user's meeting screen projection request, at least one candidate meeting reservation notification that meets a preset condition is determined from current meeting reservation notifications of the user. The meeting prompt information corresponding to each candidate meeting reservation notification is obtained and displayed. The first screen projection code corresponding to the meeting prompt information is obtained. In response to detecting a screen projection instruction of the user for a target meeting prompt information of the meeting prompt information, a screen projection connection with a screen projection device is performed based on the first screen projection code and the target meeting prompt information. Therefore, manually obtaining and entering the projection code could be avoided, and the efficiency of projection access is improved.

In different application scenarios, it is determined that the first screen projection code corresponding to the meeting prompt information may be different. The following example are illustrated as follows.

Example 1

In the example, in order to improve the screen projection efficiency, the meeting prompt message and the first screen projection code corresponding to each meeting reservation notification are obtained in advance. As illustrated in FIG. 5, the meeting prompt message and the first screen projection are obtained according to the NLP technology and stored in the local meeting database, so that by directly querying the local database, the first screen projection code corresponding to the meeting prompt information is determined.

Example 2

In the example, in order to reduce a memory usage of the terminal device, the first screen projection code may be obtained in real time, that is, the meeting prompt information is sent to the server, and the first screen projection code corresponding to the meeting prompt information fed back by the server is obtained. The server includes a correspondence between the meeting prompt information and the corresponding first screen projection code.

In conclusion, according to the screen projecting method of the embodiments of the disclosure, the screen projection code of the meeting prompt information is obtained in an automatic identification manner, thereby avoiding manual acquisition and input by the user, and improving the efficiency of the meeting screen projection.

Based on the above embodiments, if the current meeting room is not the meeting room where the user wants to perform screen projection, the interface also provides a solution for the user to enter the projection code, and the user clicks to enter the projection code, to enter the meeting room and connect to the meeting room by entering the projecting code on the interface of the projector in the meeting room.

Figure 8:
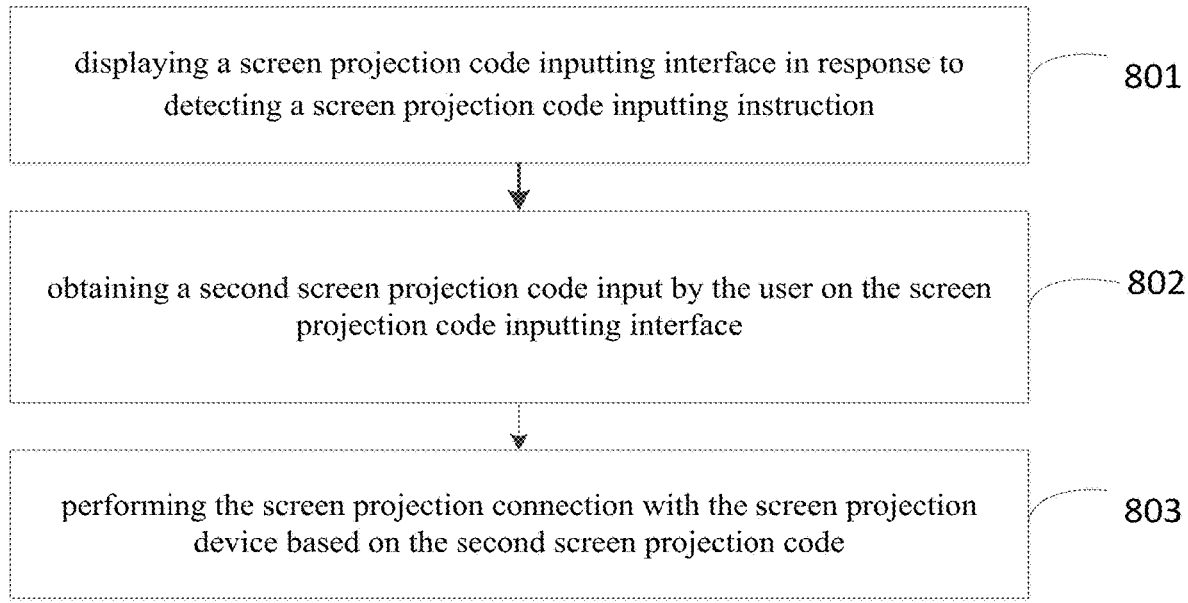
FIG. 8 is a flowchart of a screen projection method according to an eighth embodiment of the disclosure.

In an embodiment, as illustrated in FIG. 8, the method further includes the following steps.

In step 801, a projection code inputting interface is displayed in response to detecting a screen projection code inputting instruction.

In an embodiment, the projection code inputting instruction may be obtained by triggering a relevant control on the interface, or through the user's voice input. If the user's projection code inputting instruction is detected, the projection code inputting interface is displayed.

In step 802, a second screen projection code input by the user on the screen projection code inputting interface is obtained.

In step 803, the screen projection connection is performed with the screen projection device based on the second screen projection code.

In an embodiment, the second screen projection code input by the user on the screen projection code inputting interface is obtained, and screen projection connection processing with the projection device is performed according to the second screen projection code. The above screen projection connection processing refers to the screen projection connection with the screen projection device performed based on the second screen projection code, which is not limited here.

Figure 9:
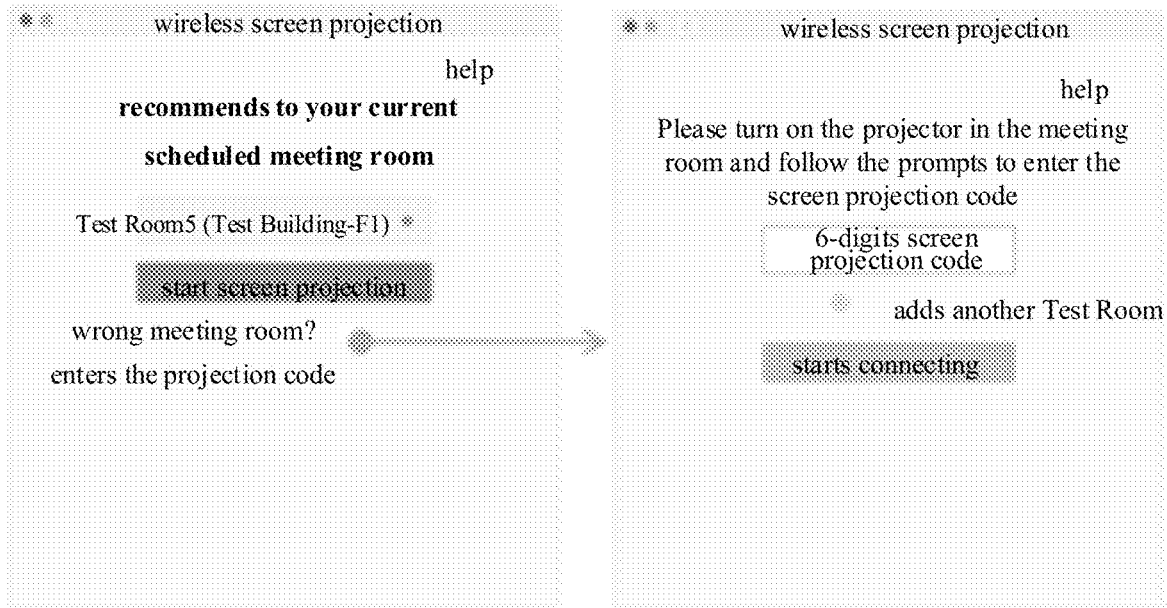
FIG. 9 is a schematic diagram of a screen projection scene according to a ninth embodiment of the disclosure.
Figure 10:
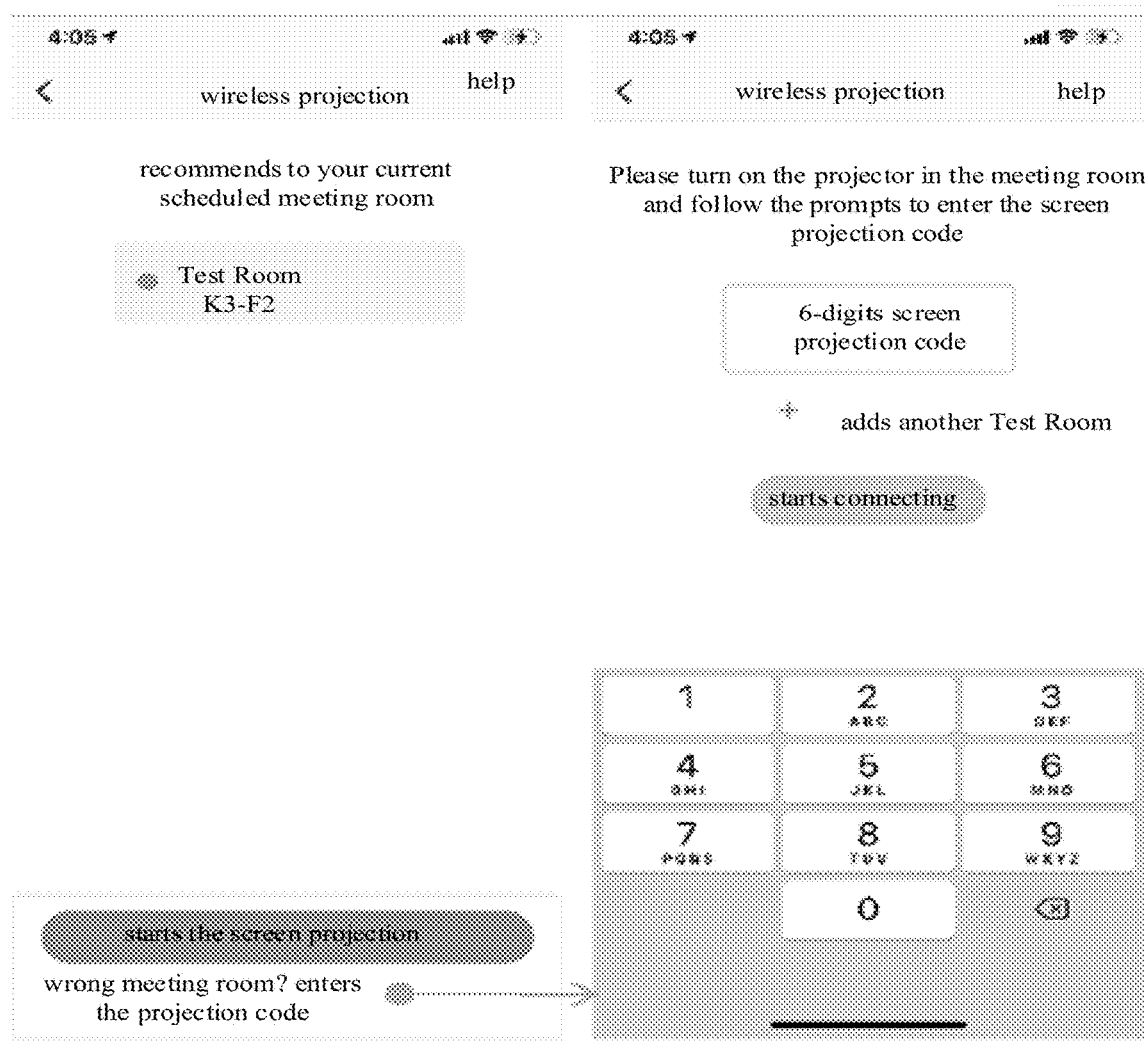
FIG. 10 is a schematic diagram of a screen projection scene according to a tenth embodiment of the disclosure.

For example, as illustrated in FIGS. 9 and 10, if the current meeting room is not the meeting room where the user wants to perform screen projection, the interface also provides the user with a solution of inputting screen projection code, and the user clicks and enters the projection code to enter the interface for connecting to the projector of the meeting room by entering the projection code.

In conclusion, the screen projecting method of the embodiments of the disclosure provides a way for the user to input the screen projection code, covers scenarios such as no meeting reservation notification or inaccurate information, and improves the practicability of screen projection.

Figure 11:
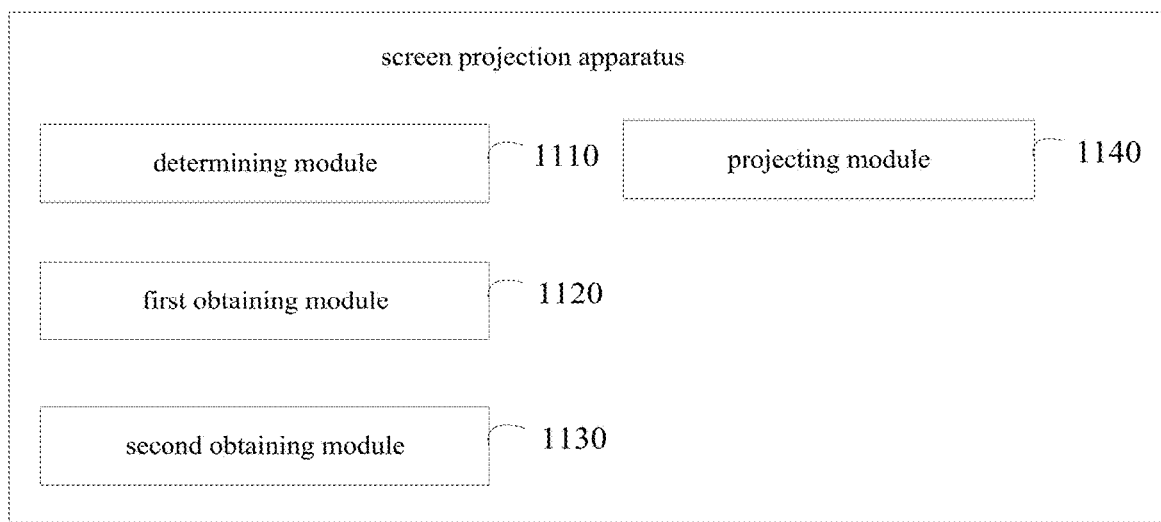
FIG. 11 is a schematic diagram of a screen projection apparatus according to an eleventh embodiment of the disclosure.

In order to implement the above embodiments, the disclosure provides a screen projection device. FIG. 11 is a schematic diagram of a screen projection apparatus according to an embodiment of the disclosure. As illustrated in FIG. 11, the screen projection apparatus includes: a determining module 1110, a first obtaining module 1120, a second obtaining module 1130, and a projecting module 1140. The determining module 1110 is configured to determine, in response to a meeting screen projection request of a user, at least one candidate meeting reservation notification that meets a preset condition from current meeting reservation notifications of the user. The first obtaining module 1120 is configured to obtain and display meeting prompt information corresponding to each candidate meeting reservation notification. The second obtaining module 1130 is configured to obtain a first screen projection code corresponding to the meeting prompt information. The projecting module 1140 is configured to perform, in response to detecting a screen projection instruction of the user for a target meeting prompt information of the meeting prompt information, a screen projection connection with a screen projection device based on the first screen projection code and the target meeting prompt information.

In an embodiment, the determining module 1110 is further configured to: identify a meeting time in the current meeting reservation notification; determine a request time of the meeting screen projection request; calculate a time difference between the meeting time and the request time; and determine the current meeting reservation notification with a time difference smaller than a preset threshold as the candidate meeting reservation notification.

In an embodiment, the first obtaining module 1120 is configured to: identify keywords of a meeting address in the candidate meeting reservation notification; and obtain and display meeting address information based on a preset database matching the keywords of the meeting address.

In an embodiment, the first obtaining module 1120 is further configured to: obtain and display meeting subject information in the candidate meeting reservation notification.

In an embodiment, the second obtaining module 1130 is configured to: send the meeting prompt information to a server, and obtain the first screen projection code corresponding to the meeting prompt information fed back from the server.

In an embodiment, the second obtaining module 1130 is configured to: determine the first screen projection code corresponding to the meeting prompt information by querying a local database.

Figure 12:
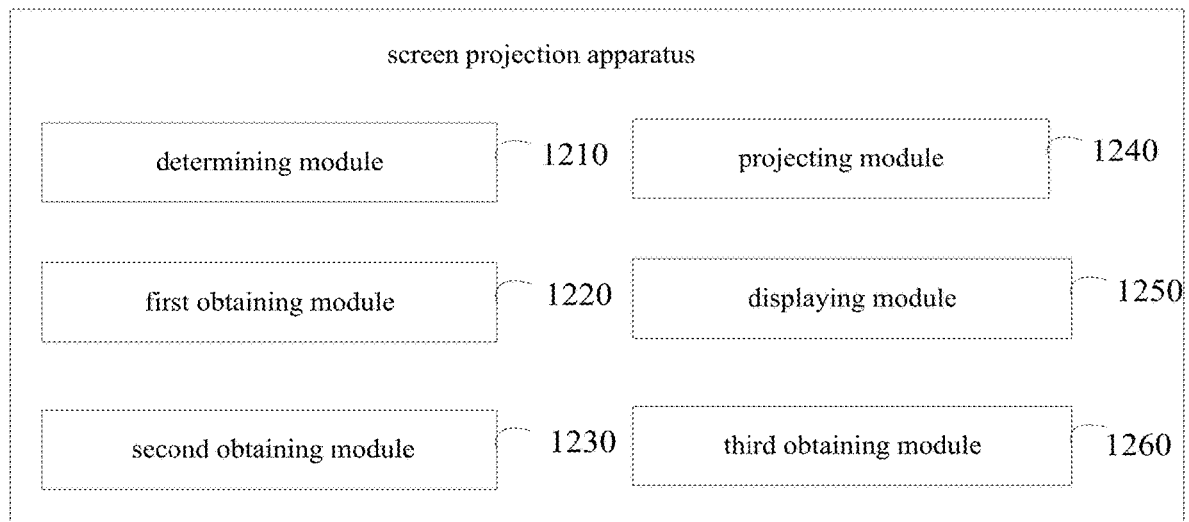
FIG. 12 is a schematic diagram of a screen projection apparatus according to a twelfth embodiment of the disclosure.

In an embodiment, as illustrated in FIG. 12, the screen projection apparatus includes: a determining module 1210, a first obtaining module 1220, a second obtaining module 1230, a projecting module 1240, a displaying module 1250, and a third obtaining module 1260. The determining module 1210, the first obtaining module 1220, the second obtaining module 1230, and the projecting module 1240 have the same functions as the determining module 1110, the first obtaining module 1120, the second obtaining module 1130, and the projecting module 1140 in FIG. 11, which is not repeated here.

In addition, the apparatus includes: a displaying module 1250 and a third obtaining module 1260. The displaying module 1250 is configured to display a screen projection code inputting interface in response to detecting a screen projection code inputting instruction. The third obtaining module 1260 is configured to obtain a second screen projection code input by the user on the screen projection code inputting interface.

In an embodiment, the projecting module 1240 is configured to perform the screen projection connection with the screen projection device based on the second screen projection code.

It should be noted that the foregoing explanations of the method embodiments are also applicable to the apparatus of the embodiments of the disclosure, and the implementation principles and technical effects are similar, which is not repeated here.

According to the embodiments of the disclosure, the disclosure also provides an electronic device, a readable storage medium and a computer program product.

Figure 13:
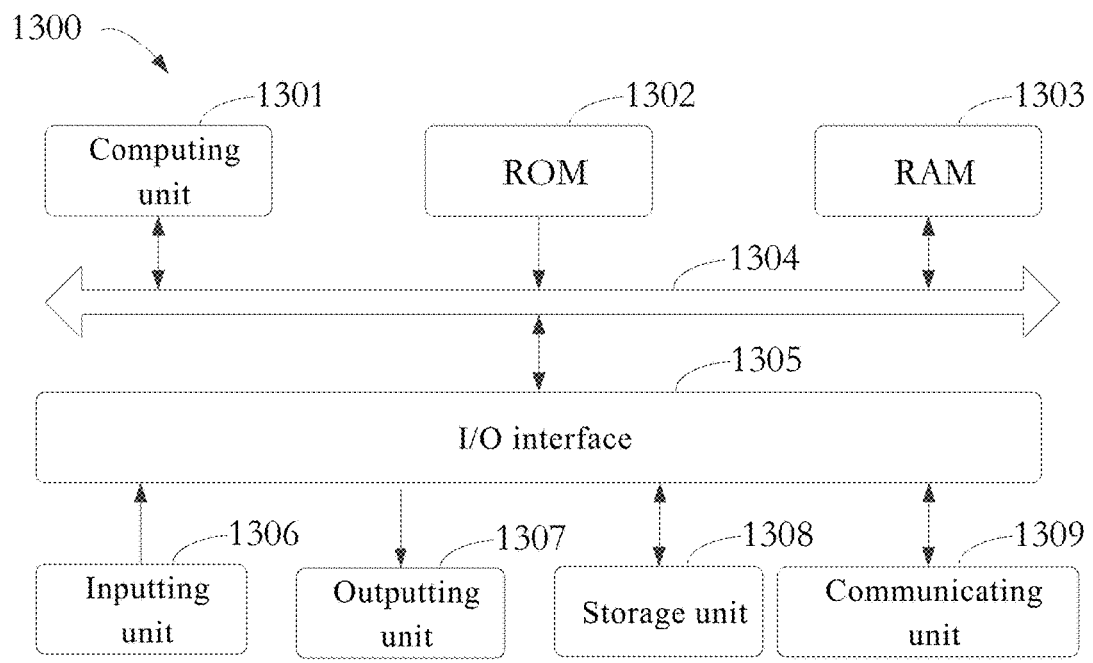
FIG. 13 is a block diagram of an electronic device used to implement the screen projection method according to an embodiment of the disclosure.

FIG. 13 is a block diagram of an electronic device 1300 configured to implement the method according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 13, the device 1300 includes a computing unit 1301 performing various appropriate actions and processes based on computer programs stored in a read-only memory (ROM) 1302 or computer programs loaded from the storage unit 1308 to a random access memory (RAM) 1303. In the RAM 1303, various programs and data required for the operation of the device 1300 are stored. The computing unit 1301, the ROM 1302, and the RAM 1303 are connected to each other through a bus 1304. An input/output (I/O) interface 1305 is also connected to the bus 1304.

Components in the device 1300 are connected to the I/O interface 1305, including: an inputting unit 1306, such as a keyboard, a mouse; an outputting unit 1307, such as various types of displays, speakers; a storage unit 13013, such as a disk, an optical disk; and a communication unit 1309, such as network cards, modems, wireless communication transceivers, and the like. The communication unit 1309 allows the device 1300 to exchange information/data with other devices through a computer network such as the Internet and/or various telecommunication networks.

The computing unit 1301 may be various general-purpose and/or dedicated processing components with processing and computing capabilities. Some examples of computing unit 1301 include, but are not limited to, a central processing unit (CPU), a graphics processing unit (GPU), various dedicated artificial intelligence (AI) computing chips, various computing units that run machine learning model algorithms, and a digital signal processor (DSP), and any appropriate processor, controller and microcontroller. The computing unit 1301 executes the various methods and processes described above, for example, a screen projection method. For example, in some embodiments, the screen projection method may be implemented as a computer software program, which is tangibly contained in a machine-readable medium, such as the storage unit 13013. In some embodiments, part or all of the computer program may be loaded and/or installed on the device 1300 via the ROM 1302 and/or the communication unit 1309. When the computer program is loaded on the RAM 1303 and executed by the computing unit 1301, one or more steps of the screen projection method described above may be executed. Alternatively, in other embodiments, the computing unit 1301 may be configured to perform the screen projection method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the screen projection method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service. The server may also be a server of a distributed system, or a server combined with a blockchain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A screen projection method, comprising:
   determining, in response to a meeting screen projection request of a user, at least one candidate meeting reservation notification that meets a preset condition from current meeting reservation notifications of the user;
   obtaining and displaying meeting prompt information corresponding to each candidate meeting reservation notification;
   obtaining a first screen projection code corresponding to the meeting prompt information; and
   performing, in response to detecting a screen projection instruction of the user for a target meeting prompt information of the meeting prompt information, a screen projection connection with a screen projection device based on the first screen projection code and the target meeting prompt information;
   wherein determining the at least one candidate meeting reservation notification that meets the preset condition of the current meeting reservation notification of the user comprises:
   identifying a meeting time in the current meeting reservation notification;
   determining a request time of the meeting screen projection request;
   calculating a time difference between the meeting time and the request time; and
   determining the current meeting reservation notification with a time difference smaller than a preset threshold as the candidate meeting reservation notification.

2. The method of claim 1, wherein obtaining and displaying the meeting prompt information corresponding to the candidate meeting reservation notification comprises:
   identifying keywords of a meeting address in the candidate meeting reservation notification; and
   obtaining and displaying meeting address information based on a preset database matching the keywords of the meeting address.

3. The method of claim 1, wherein obtaining and displaying the meeting prompt information corresponding to the candidate meeting reservation notification comprises:
   obtaining and displaying meeting subject information in the candidate meeting reservation notification.

4. The method of claim 1, wherein obtaining the first screen projection code corresponding to the meeting prompt information comprises:
   sending the meeting prompt information to a server, and obtaining the first screen projection code corresponding to the meeting prompt information fed back from the server.

5. The method of claim 1, wherein obtaining the first screen projection code corresponding to the meeting prompt information comprises:
   determining the first screen projection code corresponding to the meeting prompt information by querying a local database.

6. The method of claim 1, further comprising:
   displaying a screen projection code inputting interface in response to detecting a screen projection code inputting instruction;
   obtaining a second screen projection code input by the user on the screen projection code inputting interface; and
   performing the screen projection connection with the screen projection device based on the second screen projection code.

7. A screen projection apparatus, comprising:
   one or more processors;
   a memory storing instructions executable by the one or more processors;
   wherein the one or more processors are configured to:
   determine, in response to a meeting screen projection request of a user, at least one candidate meeting reservation notification that meets a preset condition from current meeting reservation notifications of the user;

obtain and display meeting prompt information corresponding to each candidate meeting reservation notification;

obtain a first screen projection code corresponding to the meeting prompt information; and perform, in response to detecting a screen projection instruction of the user for a target meeting prompt information of the meeting prompt information, a screen projection connection with a screen projection device based on the first screen projection code and the target meeting prompt information;

wherein the one or more processors are configured to:

identify a meeting time in the current meeting reservation notification;

determine a request time of the meeting screen projection request;

calculate a time difference between the meeting time and the request time; and determine the current meeting reservation notification with a time difference smaller than a preset threshold as the candidate meeting reservation notification.

8. The apparatus of claim 7, wherein the one or more processors are configured to:

identify keywords of a meeting address in the candidate meeting reservation notification; and obtain and display meeting address information based on a preset database matching the keywords of the meeting address.

9. The apparatus of claim 7, wherein the one or more processors are configured to:

obtain and display meeting subject information in the candidate meeting reservation notification.

10. The apparatus of claim 7, wherein the one or more processors are configured to:

send the meeting prompt information to a server, and obtain the first screen projection code corresponding to the meeting prompt information fed back from the server.

11. The apparatus of claim 7, wherein the one or more processors are configured to:

determine the first screen projection code corresponding to the meeting prompt information by querying a local database.

12. The apparatus of claim 7, wherein the one or more processors are configured to:

a displaying module, configured to display a screen projection code inputting interface in response to detecting a screen projection code inputting instruction;

a third obtaining module, configured to obtain a second screen projection code input by the user on the screen projection code inputting interface;

wherein the projecting module is configured to perform the screen projection connection with the screen projection device based on the second screen projection code.

13. A non-transitory computer-readable storage medium storing computer instructions, wherein the computer instructions are used to make the computer execute a screen projection method, and the method comprises:

determining, in response to a meeting screen projection request of a user, at least one candidate meeting reservation notification that meets a preset condition from current meeting reservation notifications of the user;

obtaining and displaying meeting prompt information corresponding to each candidate meeting reservation notification;

obtaining a first screen projection code corresponding to the meeting prompt information; and performing, in response to detecting a screen projection instruction of the user for a target meeting prompt information of the meeting prompt information, a screen projection connection with a screen projection device based on the first screen projection code and the target meeting prompt information;

wherein determining the at least one candidate meeting reservation notification that meets the preset condition of the current meeting reservation notification of the user comprises:

identifying a meeting time in the current meeting reservation notification;

determining a request time of the meeting screen projection request;

calculating a time difference between the meeting time and the request time; and determining the current meeting reservation notification with a time difference smaller than a preset threshold as the candidate meeting reservation notification.

* * * * *